United States Patent
Takayama

(10) Patent No.: US 11,824,421 B2
(45) Date of Patent: Nov. 21, 2023

(54) RESIN-MOLDED STATOR, OUTER ROTOR-TYPE MOTOR, AIR BLOWER, AND AIR CONDITIONING APPARATUS

(71) Applicant: DAIKIN INDUSTRIES, LTD., Osaka (JP)

(72) Inventor: Yoshinori Takayama, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/117,705

(22) Filed: Mar. 6, 2023

(65) Prior Publication Data
US 2023/0208250 A1  Jun. 29, 2023

Related U.S. Application Data

(63) Continuation of application No. PCT/JP2021/032757, filed on Sep. 7, 2021.

(30) Foreign Application Priority Data

Sep. 9, 2020  (JP) ................................. 2020-151682

(51) Int. Cl.
*H02K 3/52* (2006.01)
*H02K 3/50* (2006.01)
(Continued)

(52) U.S. Cl.
CPC ............... *H02K 5/225* (2013.01); *H02K 3/50* (2013.01); *H02K 3/52* (2013.01); *H02K 3/522* (2013.01);
(Continued)

(58) Field of Classification Search
CPC ........ H02K 5/225; H02K 3/522; H02K 21/22; H02K 3/50; H02K 3/52; F04D 25/06; H01R 4/185; H01R 4/48
(Continued)

(56) References Cited

U.S. PATENT DOCUMENTS 9,502,940 B2 * 11/2016 Yoshida ................... H02K 3/48
2004/0157478 A1    8/2004 Midorikawa et al.
(Continued)

FOREIGN PATENT DOCUMENTS

JP    2003-163040 A    6/2003
JP    2004-241253 A    8/2004
(Continued)

OTHER PUBLICATIONS

International Preliminary Report on Patentability and English translation of the Written Opinion of the International Searching Authority, for International Application No. PCT/JP2021/032757, dated Mar. 7, 2023.
International Search Report (PCT/ISA/210), issued in PCT/JP2021/032757, dated Oct. 19, 2021.

*Primary Examiner* — Alexander A Singh
(74) *Attorney, Agent, or Firm* — Birch, Stewart, Kolasch & Birch, LLP

(57) ABSTRACT

In resin molding, potting to be conducted with a male terminal bonded to a female terminal increases costs and processes. A resin-molded stator includes a coil, a female terminal, a male terminal, and an insulator. The female terminal includes a female terminal connection portion and a spring portion. The male terminal includes a male terminal connection portion, a wire connection portion, and a second surface contact portion. The insulator accommodates the female terminal connection portion, the spring portion, and the male terminal connection portion, and electrically connects the male terminal to the female terminal. The second surface contact portion faces a second surface of the insulator wall.

20 Claims, 12 Drawing Sheets

(51) Int. Cl.
*H02K 5/22* (2006.01)
*H02K 21/22* (2006.01)
*H01R 4/48* (2006.01)
*H01R 4/18* (2006.01)
*F04D 25/06* (2006.01)

(52) U.S. Cl.
CPC .............. *H02K 21/22* (2013.01); *F04D 25/06* (2013.01); *H01R 4/185* (2013.01); *H01R 4/48* (2013.01)

(58) Field of Classification Search
USPC .......................................................... 310/71
See application file for complete search history.

(56) References Cited

U.S. PATENT DOCUMENTS

| | | | |
|---|---|---|---|
| 2004/0240187 | A1 | 12/2004 | Takabatake et al. |
| 2010/0158216 | A1 | 8/2010 | Lee et al. |
| 2011/0316365 | A1* | 12/2011 | Kim .................. H02K 3/28 310/43 |

FOREIGN PATENT DOCUMENTS

| | | | |
|---|---|---|---|
| JP | 2005-19959 | A | 1/2005 |
| JP | 2010-154741 | A | 7/2010 |
| JP | 3164587 | U | 12/2010 |
| JP | 2020-4496 | A | 1/2020 |

* cited by examiner

US 11,824,421 B2

RESIN-MOLDED STATOR, OUTER ROTOR-TYPE MOTOR, AIR BLOWER, AND AIR CONDITIONING APPARATUS

CROSS REFERENCE TO RELATED APPLICATIONS

This application is a Continuation of PCT International Application No. PCT/JP2021/032757, filed on Sep. 7, 2021, which claims priority under 35 U.S.C. 119(a) to Patent Application No. 2020-151682, filed in Japan on Sep. 9, 2020, all of which are hereby expressly incorporated by reference into the present application.

TECHNICAL FIELD

The present disclosure relates to a resin-molded stator, an outer rotor-type motor, an air blower, and an air conditioning apparatus.

BACKGROUND ART

Patent Literature 1 (JP 2003-163040 A) discloses a technique, in electrically connecting a male terminal to a female terminal, to subject an electrical connection portion between the male terminal and female terminal to potting with the male terminal bonded to the female terminal, so as to avoid a conduction failure owing to a gap between the male terminal and the female terminal.

SUMMARY

A first aspect is directed to a resin-molded stator to be subjected to resin molding. The resin-molded stator includes a coil, a female terminal, a male terminal, and an insulator. The female terminal includes a female terminal connection portion and a spring portion. The female terminal is electrically connected to the coil. The male terminal includes a male terminal connection portion and a wire connection portion. The male terminal is for motor connection. The insulator includes an accommodation portion. The accommodation portion accommodates the female terminal connection portion, the spring portion, and the male terminal connection portion, and electrically connects the male terminal to the female terminal. The insulator includes an insulator wall which is a one-directional wall that forms the accommodation portion. A first surface of the insulator wall is in contact with the female terminal connection portion. The male terminal connection portion is pressed against the female terminal connection portion by the spring portion, and is electrically connected to the female terminal connection portion. The wire connection portion extends opposite to the first surface of the insulator wall. The male terminal further includes a second surface contact portion. The second surface contact portion faces a second surface of the insulator wall, the second surface corresponding to a reverse side of the insulator wall with respect to the first surface.

DESCRIPTION OF EMBODIMENTS

In the following description, the terms that represent directions and positional relationships, such as "front", "rear", "upper", "lower", "right", and "left", are defined with directions "front", "rear", "upper", "lower", "right", and "left" indicated by arrows in FIG. 1 and the like unless otherwise specified.

(1) Configuration of Air Conditioning Apparatus

An air conditioning apparatus 100 includes an air-conditioning indoor unit 80 and an air-conditioning outdoor unit (not illustrated). The air-conditioning indoor unit 80 and the air-conditioning outdoor unit (not illustrated) achieve a vapor compression refrigerant cycle to carry out air conditioning operations for, for example, cooling, heating, and dehumidifying a target space. FIG. 1 is an external view of the air-conditioning indoor unit 80. FIG. 2 is a longitudinal sectional view of the air-conditioning indoor unit 80.

(1-1) Configuration of Air-Conditioning Indoor Unit

The air-conditioning indoor unit 80 according to this embodiment is a wall-hung unit and is used with its rear surface hung on a wall of the target space. The terms "front", "rear", "upper", "lower", "right", and "left" indicated by the arrows in FIG. 1 represent directions of the air-conditioning indoor unit 80 that is hung on the wall and is seen from its front side toward the wall.

Figure 1:
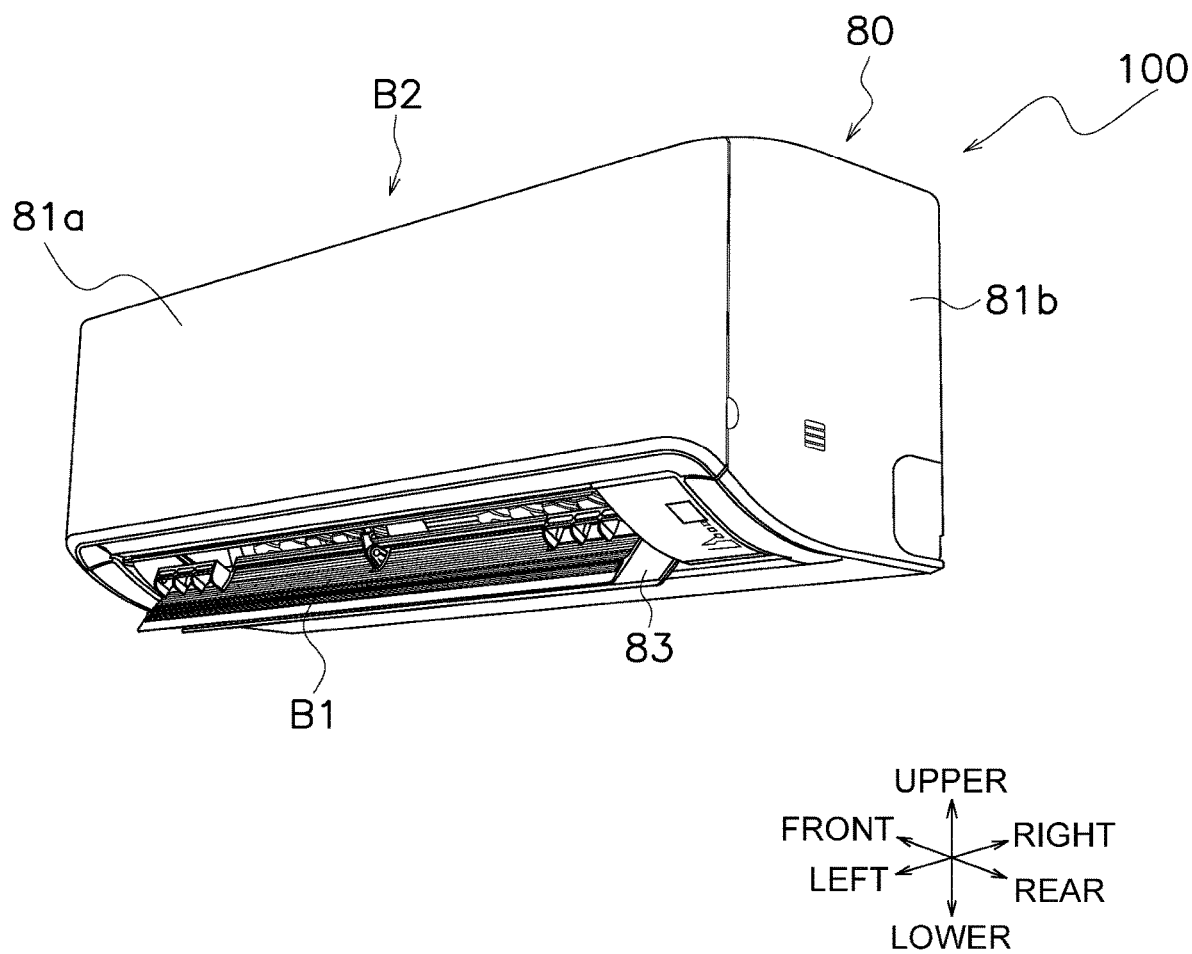
FIG. 1 is an external view of an air-conditioning indoor unit.
Figure 2:
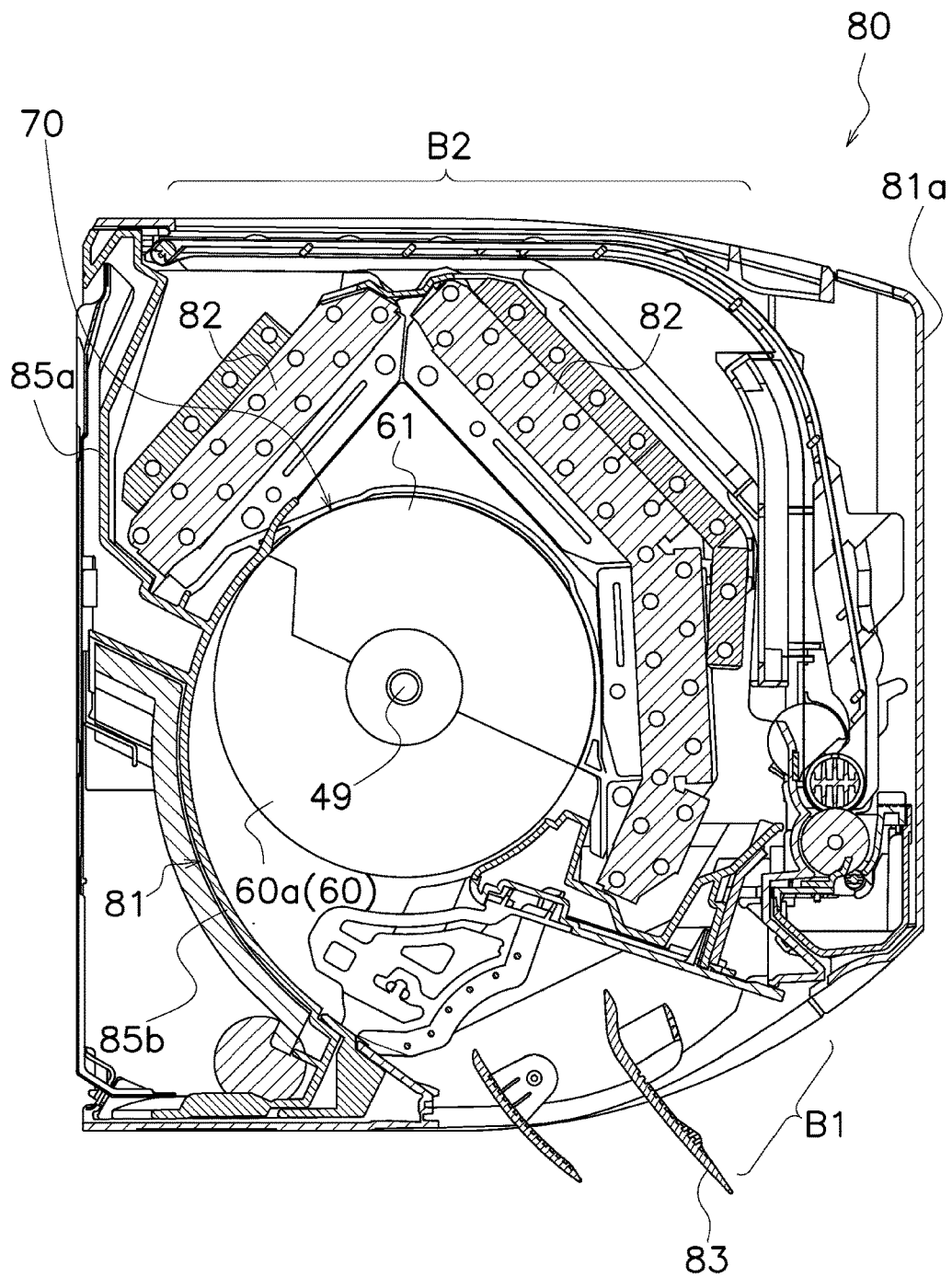
FIG. 2 is a longitudinal sectional view of the air-conditioning indoor unit.
Figure 2:
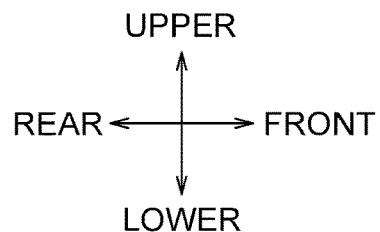

As illustrated in FIGS. 1 and 2, the air-conditioning indoor unit 80 mainly includes a frame 81, a front surface panel 81a, a main body cover 81b, a heat exchanger 82, a flap 83, and an air blower 70. The heat exchanger 82 and the air blower 70 are supported by the frame 81 and are covered with the front surface panel 81a and the main body cover 81b.

The main body cover 81b has in its upper surface an intake port B2, and also has in its lower surface a blow-out port B1. The flap 83 is disposed at the blow-out port B1.

A refrigerant flows inside a heat transfer tube of the heat exchanger 82. The refrigerant exchanges heat with air around the heat exchanger 82. The air blower 70 takes in air through the intake port B2. The air flows from the intake port B2 toward the heat exchanger 82 and then passes through the air blower 70. The air is thus blown out of the air-conditioning indoor unit 80 toward the target space through the blow-out port B1. The direction of the air to be blown out of the air-conditioning indoor unit 80 is changeable by changing the position of the flap 83.

(1-2) Configuration of Air Blower

Figure 3:
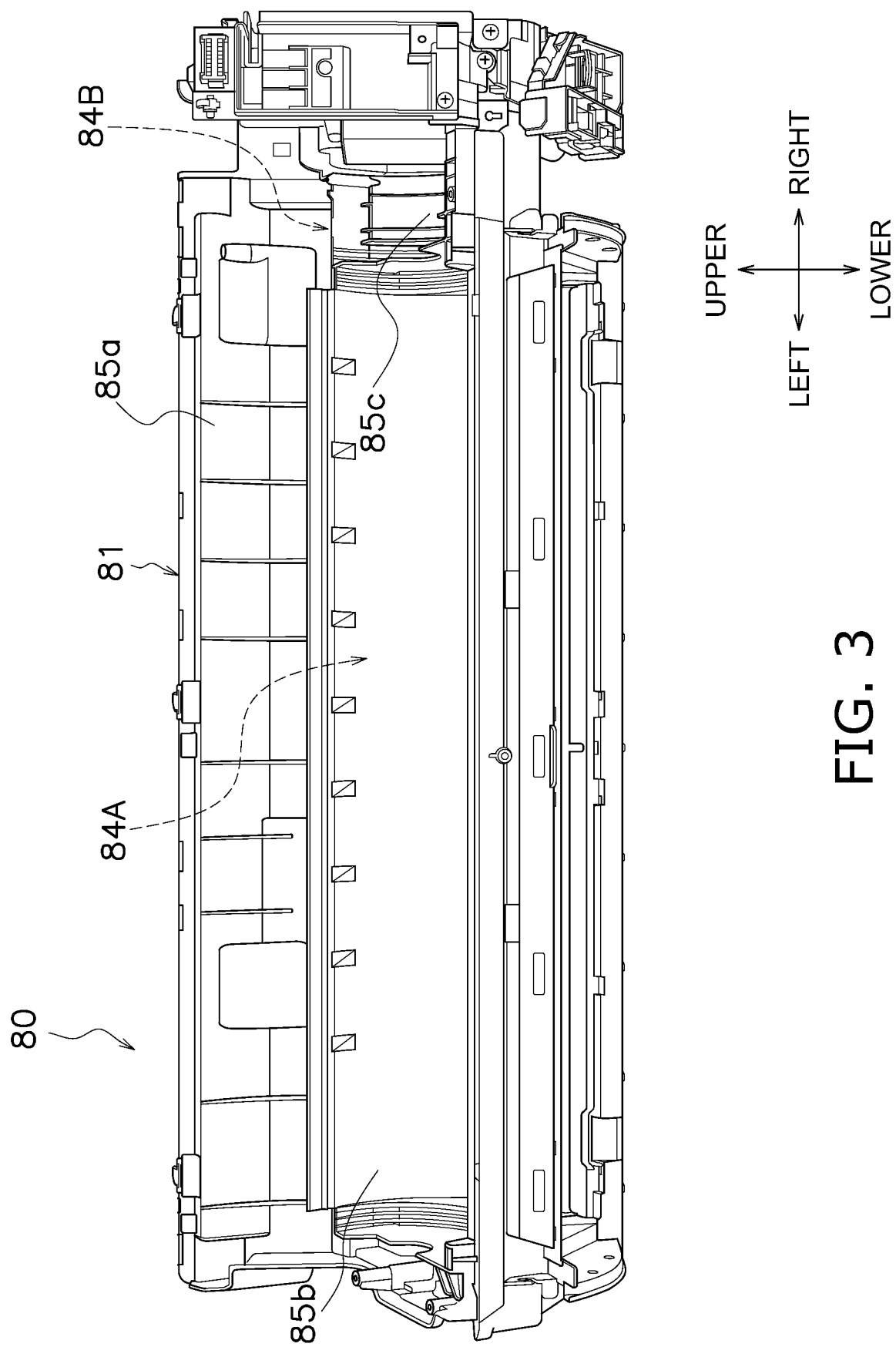
FIG. 3 is a front view of a frame and the like of the air-conditioning indoor unit.

The air blower 70 mainly includes an outer rotor-type motor 50 and a fan 60. The outer rotor-type motor 50 will be described in detail later. The fan 60 is configured to rotate with power from the outer rotor-type motor 50. In this embodiment, the fan 60 is a cross-flow fan 60*a*. The cross-flow fan 60*a* is a fan 60 including a fan rotor 61 having a cylindrical shape and extending long to left and right. The outer rotor-type motor 50 that rotates the fan rotor 61 is disposed on a right side of the cross-flow fan 60*a*. FIG. 3 is a front view of the frame 81 and the like of the air-conditioning indoor unit 80. As illustrated in FIG. 3, the cross-flow fan 60*a* is disposed in a fan accommodation space 84A in the frame 81 illustrated in FIG. 3. The outer rotor-type motor 50 is disposed in a motor accommodation space 84B in the frame 81 illustrated in FIG. 3. The frame 81 includes, for example, a rear surface portion 85*a* serving as a drain pan, a scroll portion 85*b* located below the cross-flow fan 60*a*, and a first motor support portion 85*c* supporting the outer rotor-type motor 50. The frame 81 is made of a resin.

(1-3) Configuration of Outer Rotor-Type Motor

Figure 4:
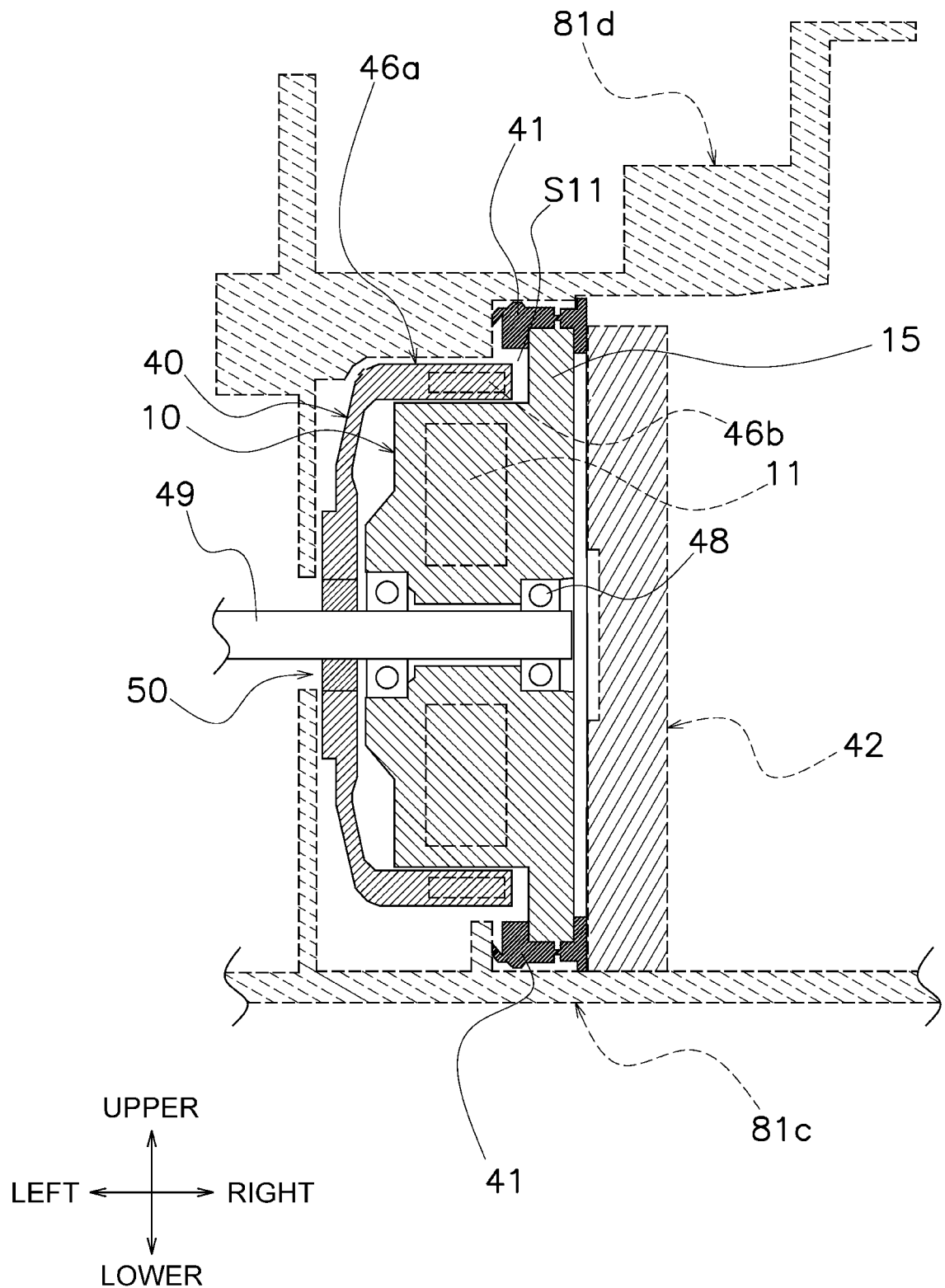
FIG. 4 is a longitudinal sectional view of an outer rotor-type motor.

FIG. 4 is a longitudinal sectional view of the outer rotor-type motor 50. As illustrated in FIG. 4, the outer rotor-type motor 50 mainly includes a resin-molded stator 10 and a rotor 40. The resin-molded stator 10 will be described in detail later. The rotor 40 includes a magnet 46*b* and a magnet holding portion 46*a* holding the magnet 46*b*. The magnet holding portion 46*a* is a cylindrical outer periphery of the rotor 40. The magnet holding portion 46*a* is located in a first space S11 having a ring shape. The first space S11 is located radially outside the resin-molded stator 10. A motor rotation shaft 49 is fixed to an inner periphery of the rotor 40. Although not illustrated in FIG. 4, the fan rotor 61 of the cross-flow fan 60*a* is fixed to a left end of the motor rotation shaft 49. As illustrated in FIG. 4, a bearing 48 is disposed between an inner periphery of the resin-molded stator 10 and the motor rotation shaft 49. The motor rotation shaft 49 and the rotor 40 are supported by the resin-molded stator 10 with the bearing 48.

Figure 5:
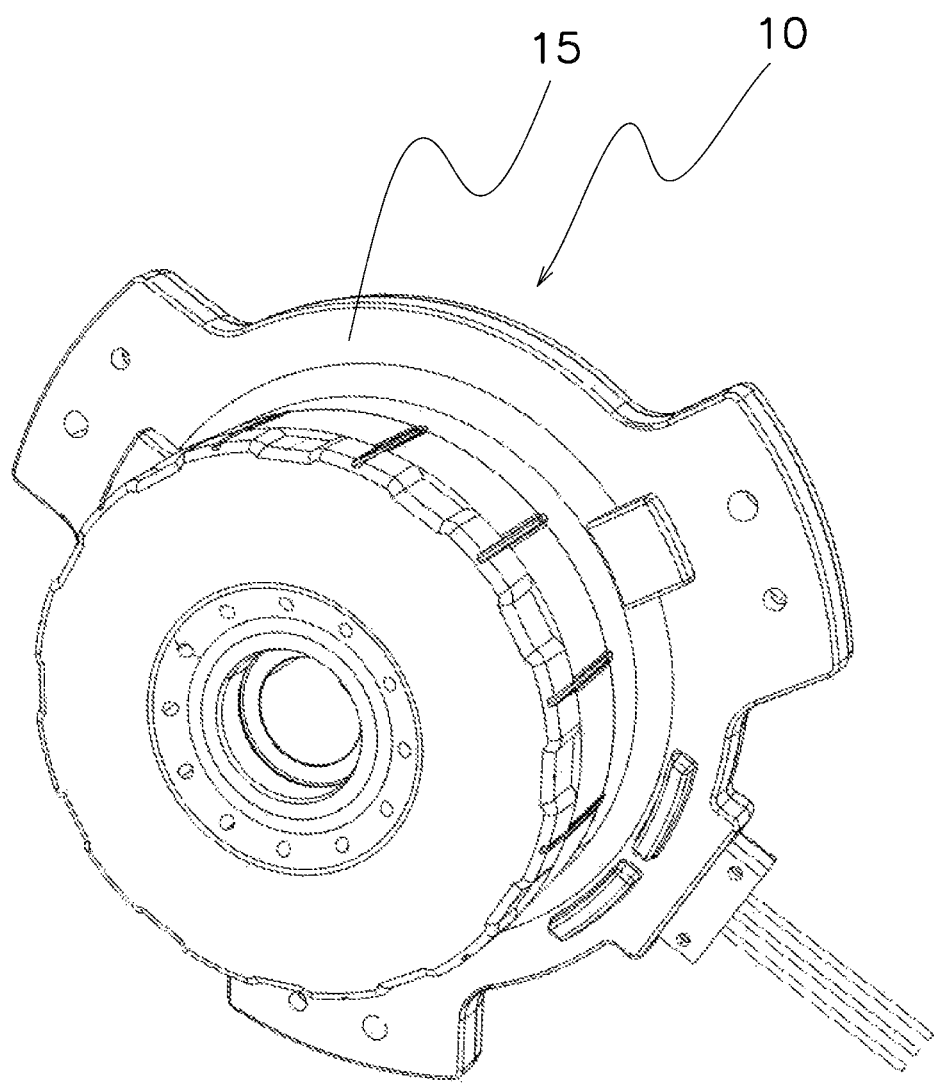
FIG. 5 is a perspective view of the resin-molded stator after resin molding, the resin-molded stator seen from its upper left side.

FIG. 5 is a perspective view of the resin-molded stator 10 seen from its upper left side. As illustrated in FIG. 5, the resin-molded stator 10 includes a mount foot 15. As illustrated in FIG. 4, the outer rotor-type motor 50 is fixed to the first motor support portion 85*c* and a second motor support portion 85*d* with a seal member 41 wound around the mount foot 15 of the resin-molded stator 10. The outer rotor-type motor 50 is sealed with a sealing member 42.

Electric current, when passing through a coil 11 of the resin-molded stator 10, generates a magnetic field, so that the rotor 40 including the magnet 46*b* rotates radially outside the resin-molded stator 10. The motor rotation shaft 49 thus rotates and, accordingly, the fan rotor 61 of the cross-flow fan 60*a* fixed to the motor rotation shaft 49 also rotates.

(2) Specific Configuration of Resin-Molded Stator

Figure 6:
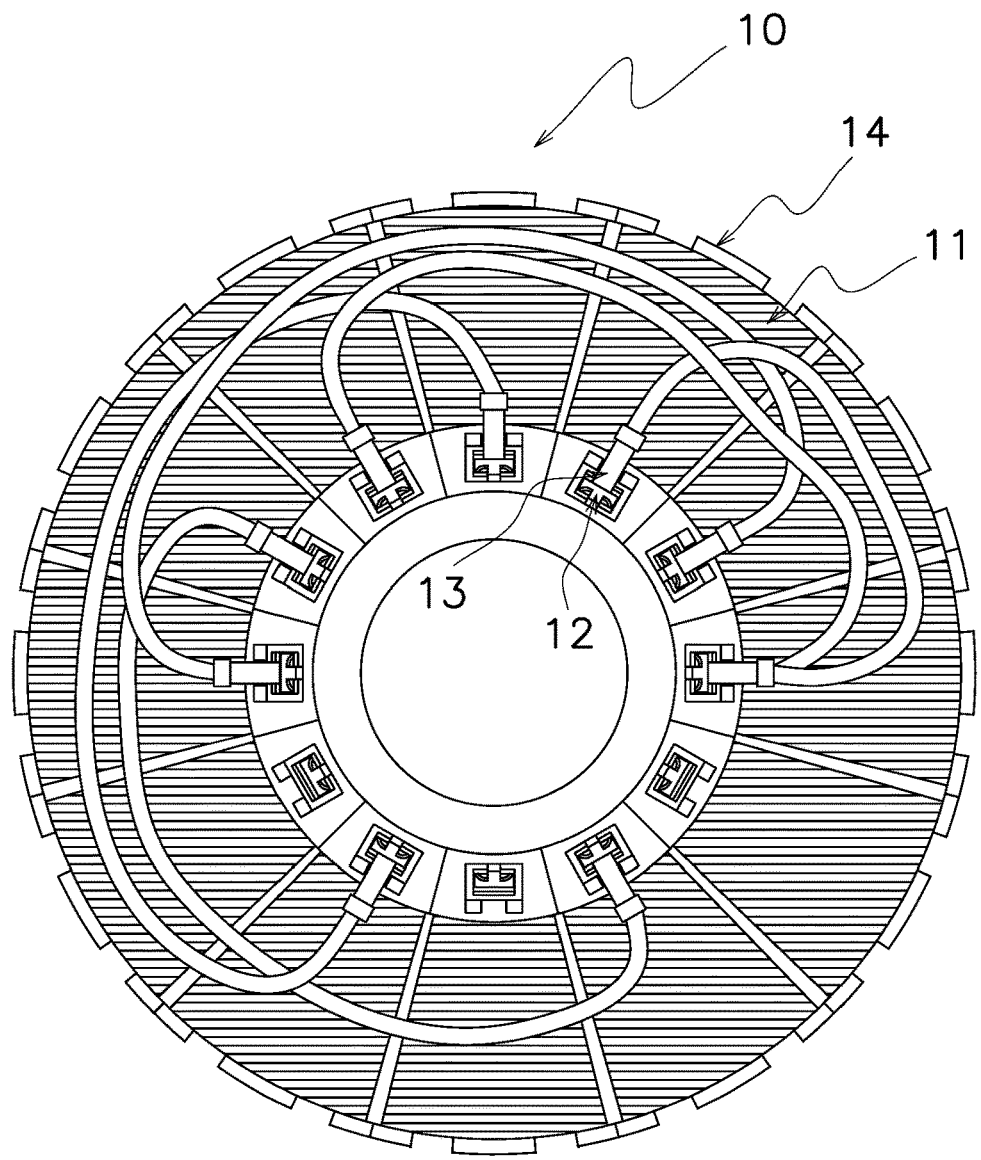
FIG. 6 is a sectional view of the resin-molded stator before the resin molding.
Figure 6:
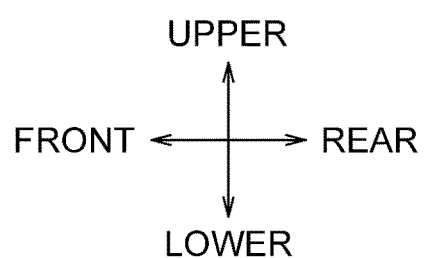

The resin-molded stator 10 is subjected to resin molding. FIG. 6 is a sectional view of the resin-molded stator 10 before the resin molding.

The resin-molded stator 10 mainly includes the coil 11, a female terminal 12, a male terminal 13, and an insulator 14.

(2-1) Insulator

Figure 7:
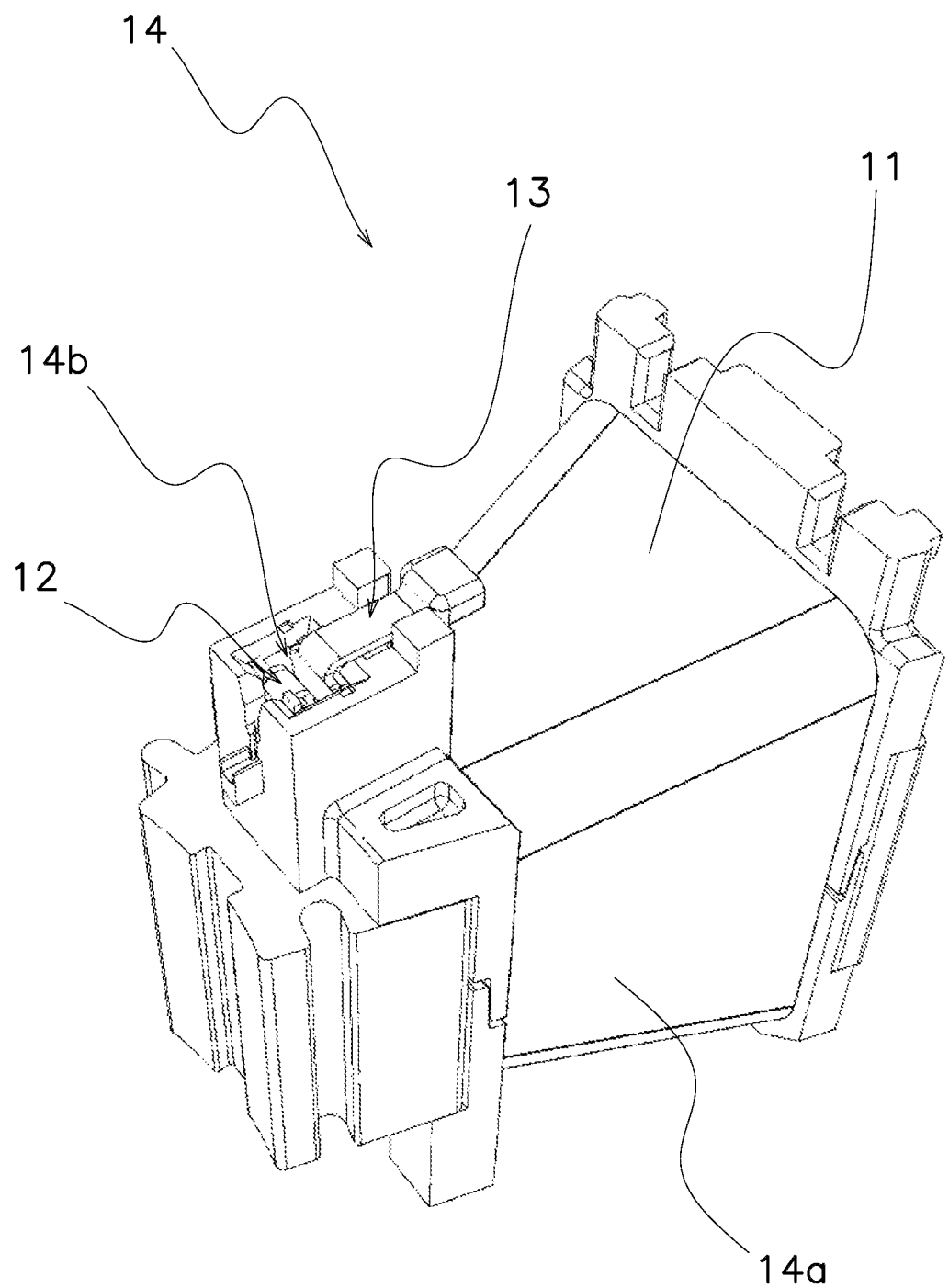
FIG. 7 is a perspective view of an insulator.
Figure 8:
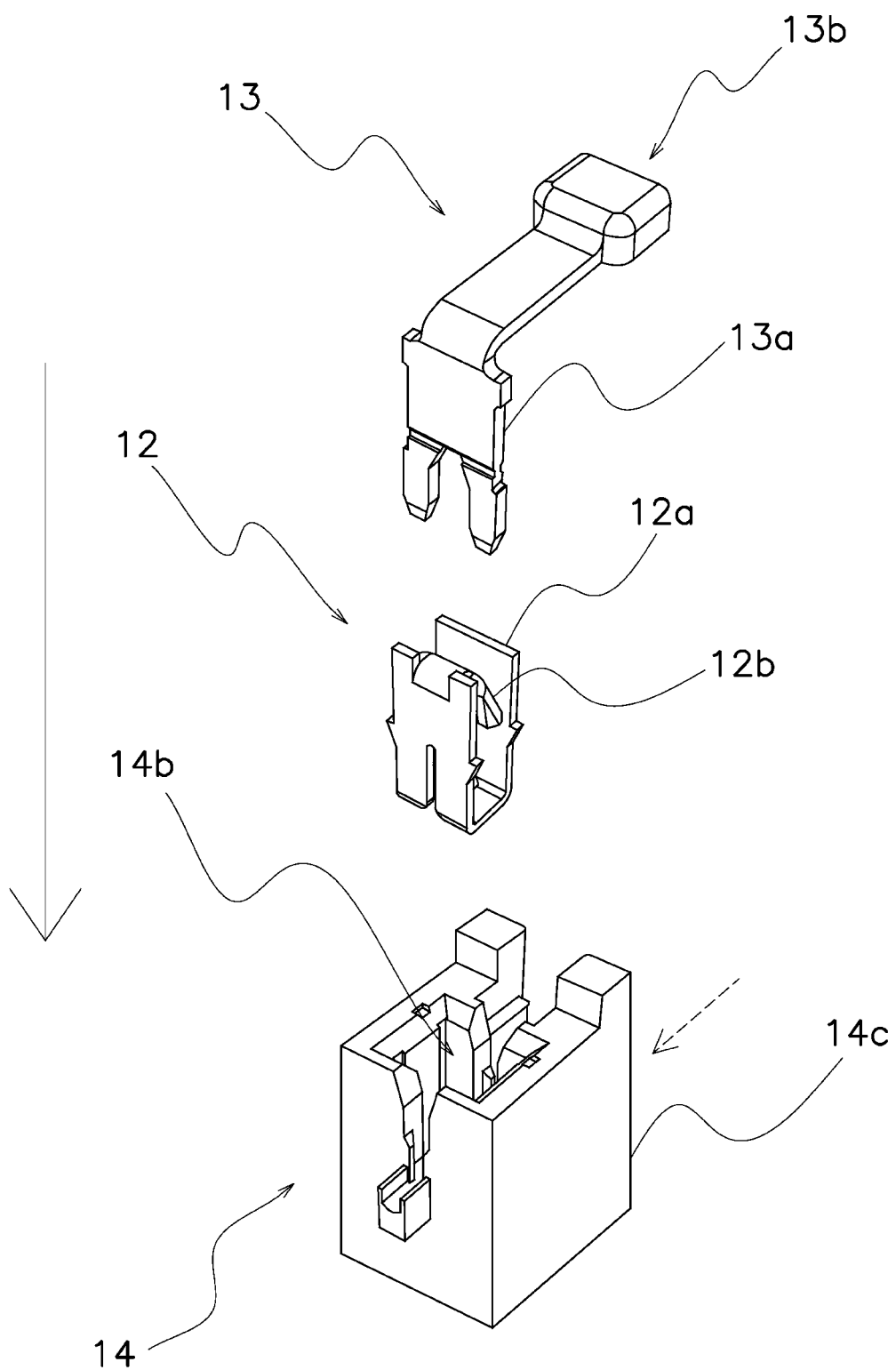
FIG. 8 is a view of how a female terminal and a male terminal are accommodated in an accommodation portion of the insulator.

As illustrated in FIG. 6, the resin-molded stator 10 includes a plurality of insulators 14. FIG. 7 is a perspective view of the insulator 14. As illustrated in FIG. 7, the insulator 14 includes a coil holding portion 14*a* around which the coil 11 is wound. It should be noted that the coil 11 is grayed in FIG. 7. The insulator 14 also includes an accommodation portion 14*b*. The accommodation portion 14*b* accommodates the female terminal 12 and the male terminal 13, and electrically connects the male terminal 13 to the female terminal 12. FIG. 8 is a view of how the female terminal 12 and the male terminal 13 are accommodated in the accommodation portion 14*b* of the insulator 14. As illustrated in FIG. 8, the female terminal 12 and the male terminal 13 are accommodated in the accommodation portion 14*b* in a direction indicated by a solid-line arrow in FIG. 8. The insulator 14 includes an insulator wall 14*c* which is a one-directional wall that forms the accommodation portion 14*b*. In FIG. 8, the insulator wall 14*c* corresponds to a wall that is not illustrated, but is indicated by a dotted-line arrow.

(2-2) Coil

As illustrated in FIGS. 6 and 7, the coil 11 is wound around the coil holding portion 14*a* of the insulator 14. A material for the coil 11, for example, aluminum or copper.

(2-3) Female Terminal

As illustrated in FIG. 8, the female terminal 12 includes a female terminal connection portion 12*a* and a spring portion 12*b*. The female terminal 12 is electrically connected to the coil 11. Functions of the female terminal connection portion 12*a* and spring portion 12*b* in electrically connecting the male terminal 13 to the female terminal 12 will be described later.

(2-4) Male Terminal

Figure 9:
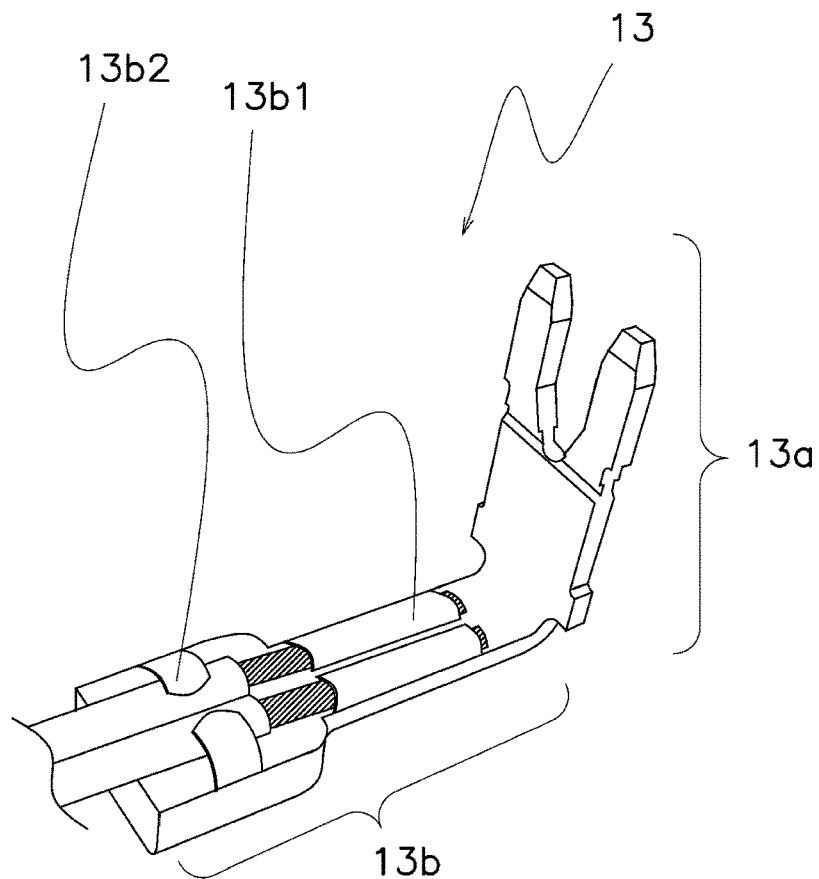
FIG. 9 is a perspective view of the male terminal.

The male terminal 13 is used for motor connection. FIG. 9 is a perspective view of the male terminal 13. As illustrated in FIG. 9, the male terminal 13 includes a male terminal connection portion 13*a* and a wire connection portion 13*b*. A function of the male terminal connection portion 13*a* in electrically connecting the male terminal 13 to the female terminal 12 will be described later. The wire connection portion 13*b* includes a wire barrel portion 13*b*1 and an insulation barrel portion 13*b*2. The wire barrel portion 13*b*1 is the portion that crimps a core of a wire. The insulation barrel portion 13*b*2 is the portion that crimps a covered wire.

Figure 10:
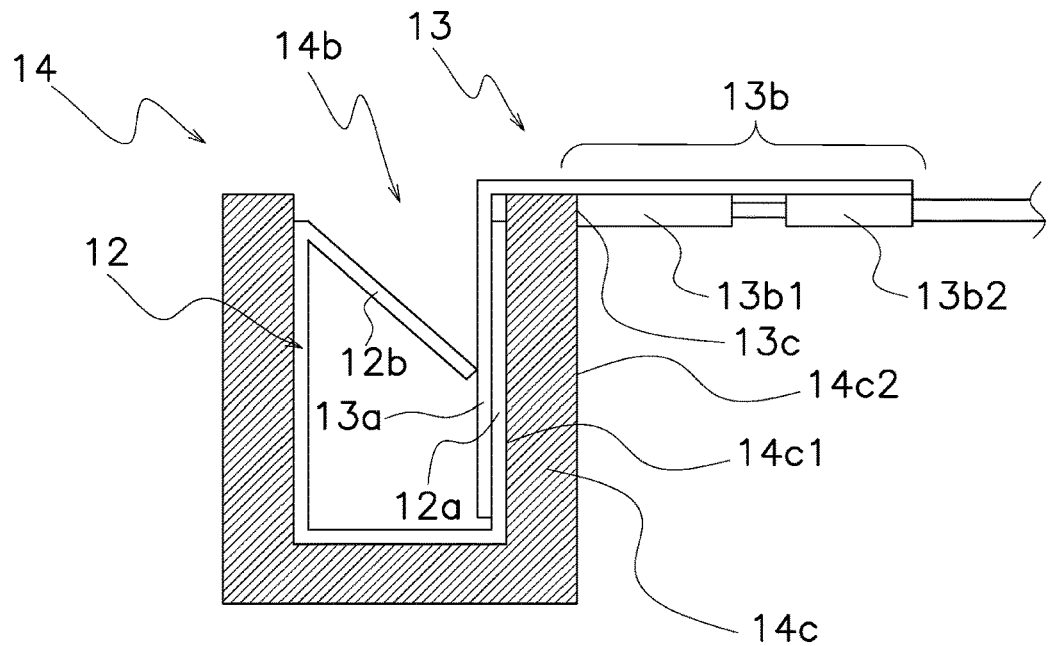
FIG. 10 is a sectional view of the accommodation portion of the insulator before the resin molding in the resin-molded stator according to an embodiment.

FIG. 10 is a sectional view of the accommodation portion 14*b* of the insulator 14 before the resin molding in the resin-molded stator 10 according to this embodiment. As illustrated in FIG. 10, the wire connection portion 13*b* extends opposite to a first surface 14*c*1 of the insulator wall 14*c*.

The male terminal 13 further includes a second surface contact portion 13*c*. As illustrated in FIG. 10, the insulator wall 14*c* is sandwiched between the male terminal connection portion 13*a* and the second surface contact portion 13*c*. In this embodiment, the second surface contact portion 13*c* corresponds to the wire barrel portion 13*b*1 of the male terminal 13.

(2-5) Electrical Connection in Accommodation Portion of Insulator

As illustrated in FIGS. 8 and 10, the accommodation portion 14*b* of the insulator 14 accommodates the female terminal connection portion 12*a*, the spring portion 12*b*, and the male terminal connection portion 13a, and electrically connects the male terminal 13 to the female terminal 12.

As illustrated in FIG. 10, the first surface 14c1 of the insulator wall 14c is in contact with the female terminal connection portion 12a. The male terminal connection portion 13a is pressed against the female terminal connection portion 12a by the spring portion 12b, and is electrically connected to the female terminal connection portion 12a.

(2-6) Change in Orientation of Male Terminal Connection Portion after Resin Molding Next, a description will be given of a comparison between the resin-molded stator 10 according to this embodiment and an existing product as to a change in orientation of the male terminal connection portion 13a after the resin molding.

Figure 11:
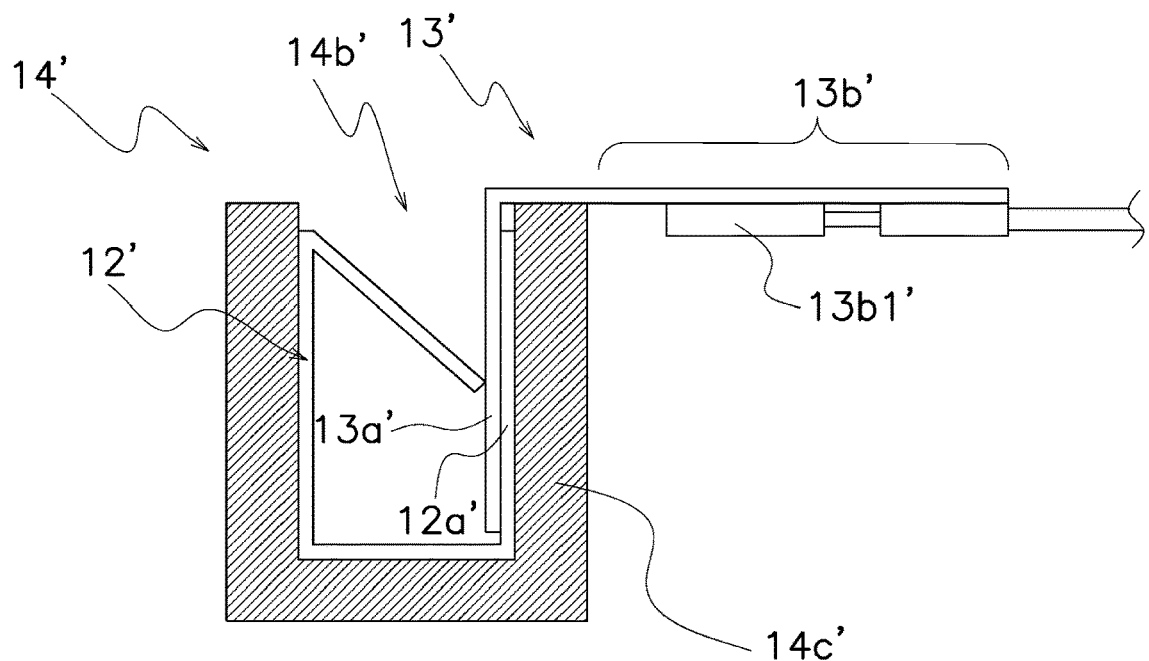
FIG. 11 is a sectional view of an accommodation portion of an insulator before resin molding in an existing product.

FIG. 11 is a sectional view of an accommodation portion 14b' of an insulator 14' before resin molding in the existing product. As illustrated in FIG. 11, the existing product does not include the second surface contact portion 13c illustrated in FIG. 10; therefore, an insulator wall 14c' is separated from a wire barrel portion 13b1'.

Figure 12:
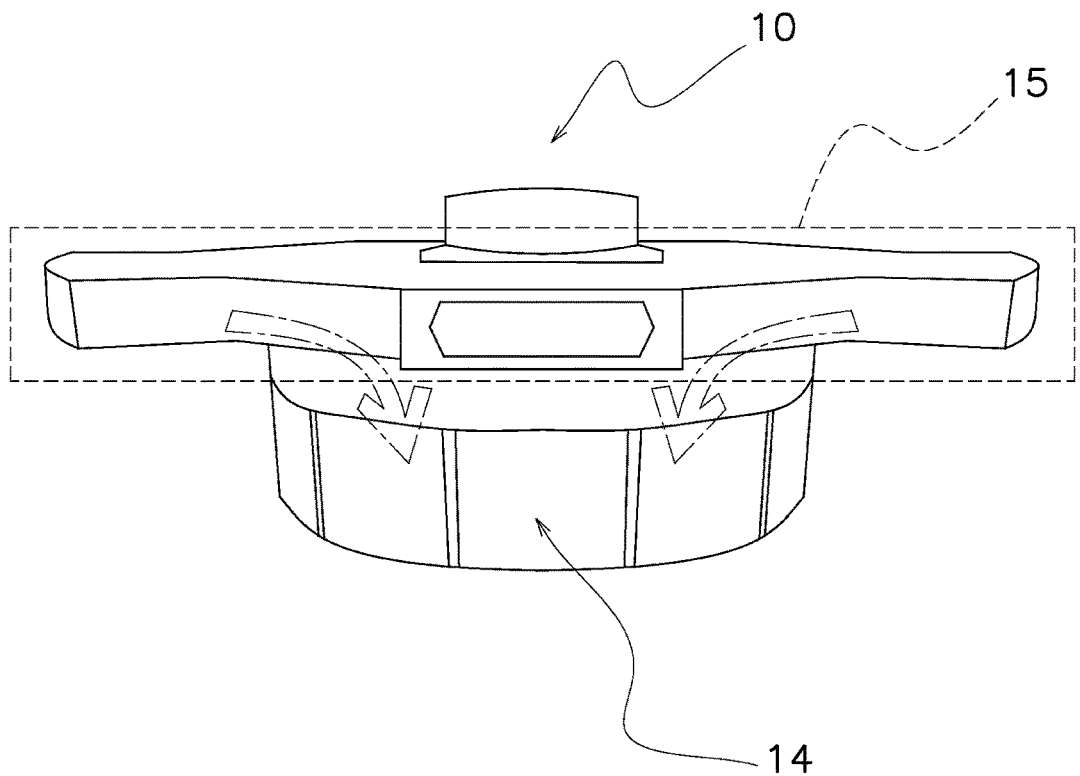
FIG. 12 is a view of a flow of a resin in the resin molding.

FIG. 12 is a view of a flow of a resin in the resin molding. As illustrated in FIG. 12, in subjecting the resin-molded stator 10 to the resin molding, the mount foot 15 is filled with the resin. The resin then flows in a direction indicated by an arrow in FIG. 12.

Figure 13:
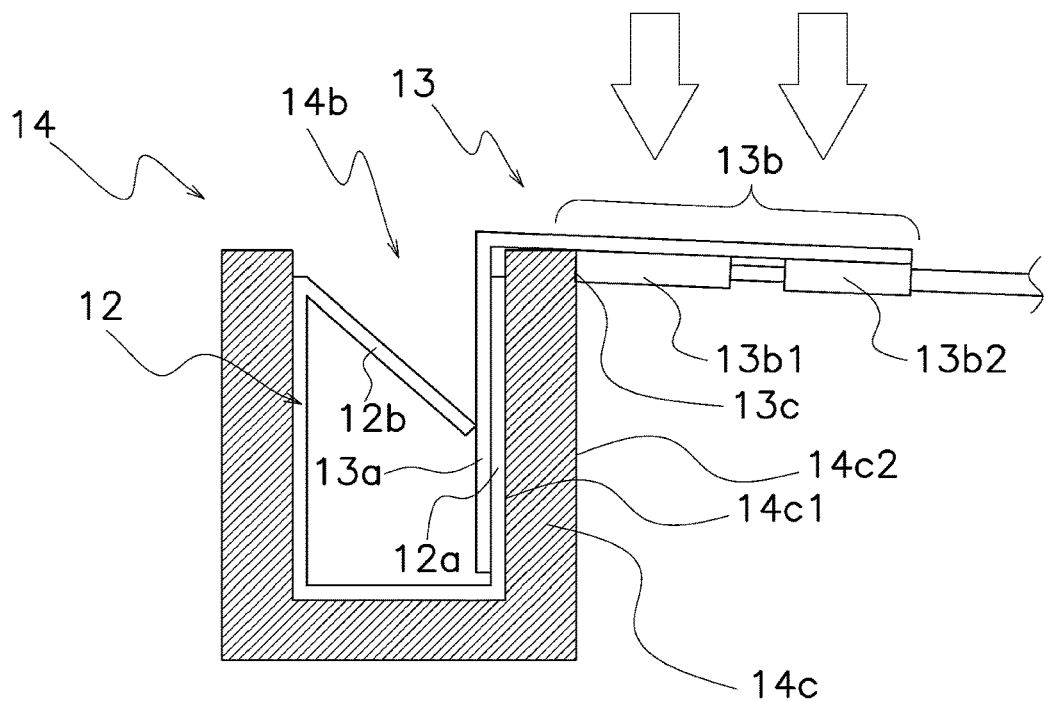
FIG. 13 is a view of a wire connection portion of the male terminal in the resin-molded stator according to the embodiment with a pressure of the flowing resin applied to the wire connection portion.

FIG. 13 is a view of the wire connection portion 13b of the male terminal 13 in the resin-molded stator 10 according to this embodiment with a pressure of the flowing resin applied to the wire connection portion 13b. As illustrated in FIG. 13, when the resin flows as illustrated in FIG. 12, the pressure of the flowing resin is applied to the wire connection portion 13b in a direction indicated by an arrow in FIG. 13. Therefore, the pressure of the flowing resin acts to separate the male terminal connection portion 13a from the female terminal connection portion 12a. However, the second surface contact portion 13c supports the male terminal 13 in contact with a second surface 14c2 of the insulator wall 14c, which is a reverse side of the insulator wall 14c with respect to the first surface 14c1, so as to dig into the second surface 14c2. This configuration thus inhibits the change in orientation of the male terminal connection portion 13a.

Figure 14:
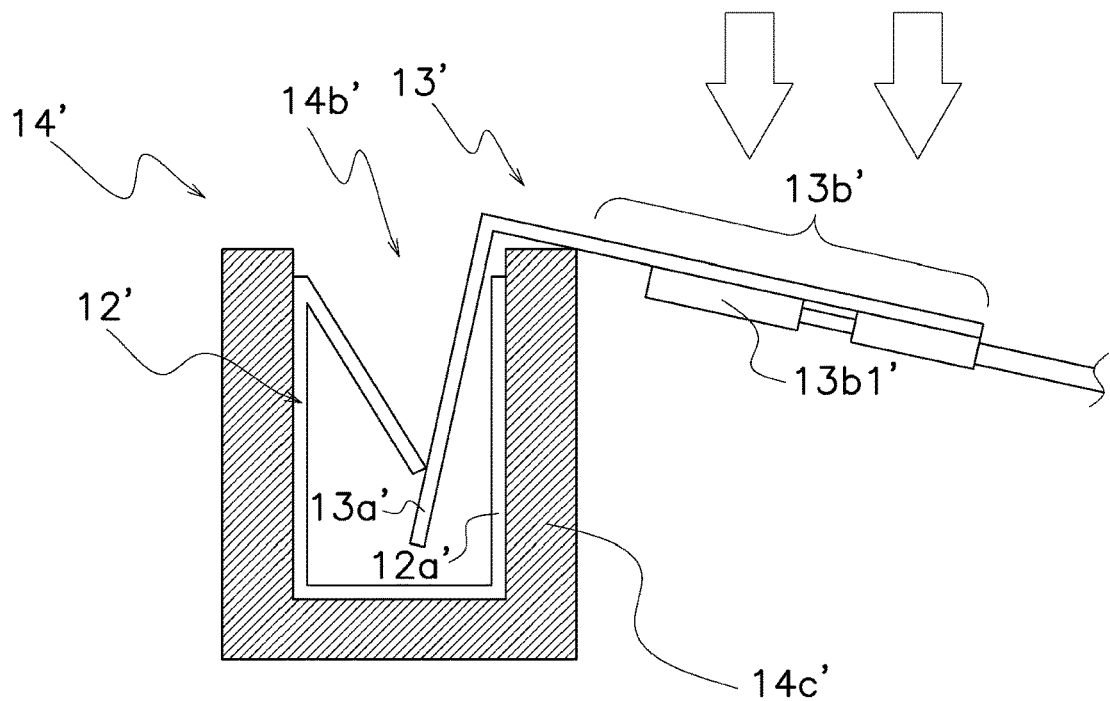
FIG. 14 is a view of a wire connection portion of a male terminal in the existing product with a pressure of a flowing resin applied to the wire connection portion.

FIG. 14 is a view of a wire connection portion 13b' of a male terminal 13' in the existing product with a pressure of a flowing resin applied to the wire connection portion 13b'. When the resin flows in a manner similar to that illustrated in FIG. 12, the pressure of the flowing resin is applied to the wire connection portion 13b' in a direction indicated by an arrow in FIG. 14, as in the case illustrated in FIG. 13. Therefore, the pressure of the flowing resin acts to separate the male terminal connection portion 13a' of the male terminal 13' from a female terminal connection portion 12a' of a female terminal 12', as in the case illustrated in FIG. 13. However, the male terminal 13' in the existing product does not include the second surface contact portion 13c. In the existing product, consequently, the male terminal connection portion 13a' is separated from the female terminal connection portion 12a'. The existing product thus fails to inhibit a change in orientation of the male terminal connection portion 13a'.

(3) Features (3-1)

There is a technique, in electrically connecting a male terminal to a female terminal, to subject an electrical connection portion between the male terminal and female terminal to potting with the male terminal bonded to the female terminal, so as to avoid a conduction failure owing to a gap between the male terminal and the female terminal. However, the potting to be conducted for the electrical connection portion between the male terminal and the female terminal with the male terminal bonded to the female terminal causes increases in cost and process for manufacturing a resin-molded stator.

The resin-molded stator 10 according to this embodiment is subjected to resin molding. The resin-molded stator 10 includes a coil 11, a female terminal 12, a male terminal 13, and an insulator 14. The female terminal 12 includes a female terminal connection portion 12a and a spring portion 12b. The female terminal 12 is electrically connected to the coil 11. The male terminal 13 includes a male terminal connection portion 13a and a wire connection portion 13b. The male terminal 13 is for motor connection. The insulator 14 includes an accommodation portion 14b. The accommodation portion 14b accommodates the female terminal connection portion 12a, the spring portion 12b, and the male terminal connection portion 13a, and electrically connects the male terminal 13 to the female terminal 12. The insulator 14 includes an insulator wall 14c which is a one-directional wall that forms the accommodation portion 14b. A first surface 14c1 of the insulator wall 14c is in contact with the female terminal connection portion 12a. The male terminal connection portion 13a is pressed against the female terminal connection portion 12a by the spring portion 12b, and is electrically connected to the female terminal connection portion 12a. The wire connection portion 13b extends opposite to the first surface 14c1 of the insulator wall 14c. The male terminal 13 further includes a second surface contact portion 13c. The second surface contact portion 13c faces a second surface 14c2 of the insulator wall 14c, the second surface 14c2 corresponding to a reverse side of the insulator wall 14c with respect to the first surface 14c1.

In the resin-molded stator 10 according to this embodiment, the second surface contact portion 13c faces the second surface 14c2 of the insulator wall 14c, the second surface 14c2 corresponding to the reverse side of the insulator wall 14c with respect to the first surface 14c1. Therefore, even if a force is exerted on the wire connection portion 13b in the resin molding, the second surface contact portion 13c is supported by the second surface 14c2 of the insulator wall 14c. This configuration inhibits a change in orientation of the male terminal connection portion 13a. This configuration therefore prevents a conduction failure without potting to be conducted with the male terminal 13 bonded to the female terminal 12. This configuration also reduces costs and processes for manufacturing the resin-molded stator 10.

(3-2)

In the resin-molded stator 10 according to this embodiment, in which the second surface contact portion 13c is configured to come into contact with the second surface 14c2 to inhibit a change in orientation of the male terminal connection portion 13a at least when a force is exerted on the wire connection portion 13b in the resin molding. Therefore, in the resin-molded stator 10 according to this embodiment, even if a force is exerted on the wire connection portion 13b in the resin molding, the second surface contact portion 13c is supported by the second surface 14c2 of the insulator wall 14c. This configuration further inhibits the change in orientation of the male terminal connection portion 13a.

(3-3)

In the resin-molded stator 10 according to this embodiment, the insulator wall 14c is sandwiched between the male terminal connection portion 13a and the second surface contact portion 13c. Therefore, the insulator wall 14c is fixed with the male terminal connection portion 13a and the second surface contact portion 13c. This configuration further inhibits the change in orientation of the male terminal connection portion 13a.

(3-4)

In the resin-molded stator 10 according to this embodiment, the second surface contact portion 13c corresponds to the wire barrel portion 13b1 of the male terminal 13. This configuration inhibits the change in orientation of the male terminal connection portion 13a, using the wire barrel portion 13b1.

(3-5)

The outer rotor-type motor 50 according to this embodiment includes the resin-molded stator 10 and the rotor 40. The rotor 40 is configured to rotate radially outside the resin-molded stator 10.

(3-6)

The air blower 70 according to this embodiment includes the outer rotor-type motor and the fan 60. The fan 60 is configured to rotate with power from the outer rotor-type motor 50.

(3-7)

The air conditioning apparatus 100 according to this embodiment includes the air blower 70.

(4) Modifications (4-1) Modification 1A

As illustrated in FIG. 10, in the foregoing embodiment, the second surface 14c2 of the insulator wall 14c supports the male terminal 13 in the resin molding.

However, the insulator 14 may further include a support surface 16a in addition to the second surface 14c2 of the insulator wall 14c. The support surface 16a is configured to support the male terminal 13 when a force is exerted on the wire connection portion 13b in the resin molding. This configuration therefore increases a portion for supporting the male terminal 13 and further inhibits the change in orientation of the male terminal connection portion 13a.

Figure 15:
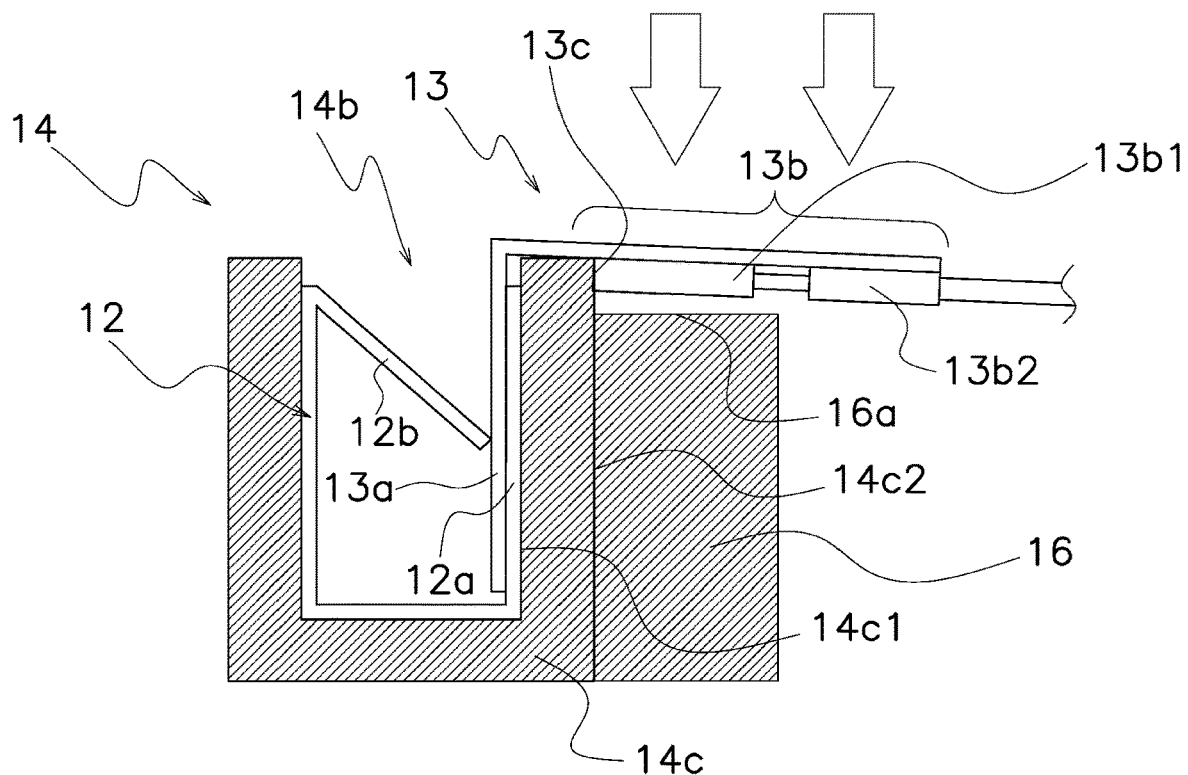
FIG. 15 is a view of an insulator pedestal placed on a second surface side of the insulator wall.

FIG. 15 is a view of an insulator pedestal 16 placed on the second surface 14c2 side of the insulator wall 14c. The insulator pedestal 16 includes the support surface 16a in the direction of the wire connection portion 13b. Even in a case where the male terminal 13 cannot be supported only by the second surface 14c2 of the insulator wall 14c due to a high pressure of the flowing resin applied to the wire connection portion 13b, the male terminal 13 can be supported by both the second surface 14c2 of the insulator wall 14c and the support surface 16a.

(4-2) Modification 1B

In the foregoing embodiment, the insulator wall 14c is sandwiched between the male terminal connection portion 13a and the second surface contact portion 13c. In the foregoing embodiment, the second surface contact portion 13c corresponds to the wire barrel portion 13b1.

Figure 16:
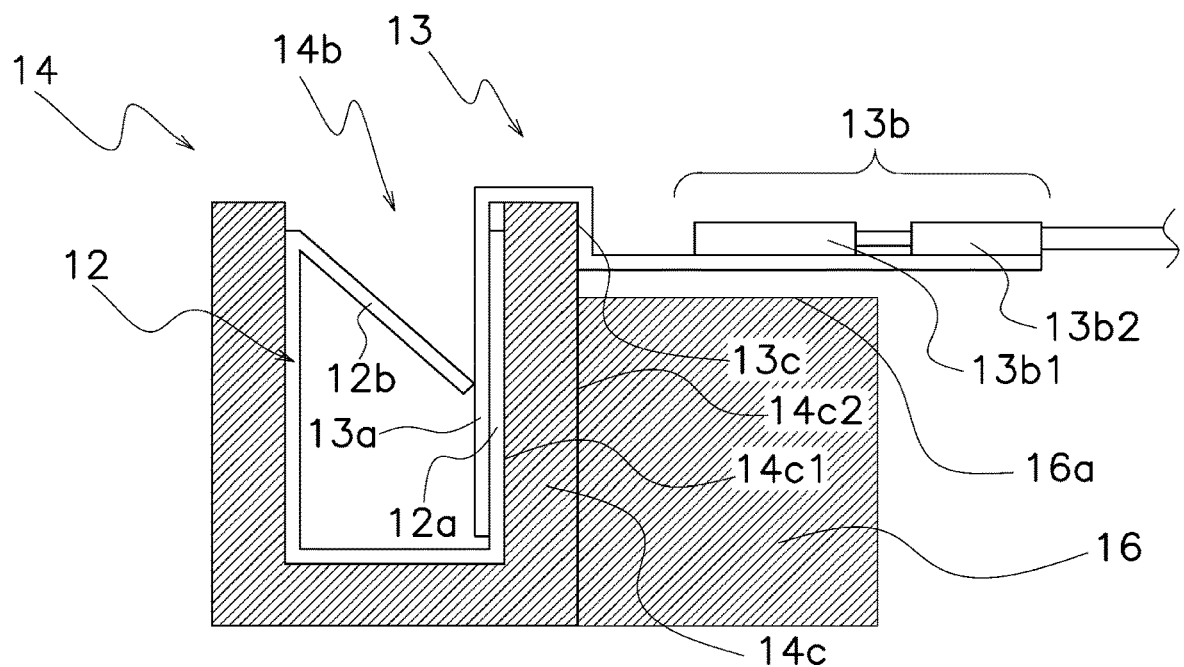
FIG. 16 is a sectional view of an accommodation portion of an insulator before resin molding in a resin-molded stator according to Modification 1B.

However, the second surface contact portion 13c do not necessarily correspond to the wire barrel portion 13b1. FIG. 16 is a sectional view of an accommodation portion 14b of an insulator 14 before resin molding in a resin-molded stator 10 according to Modification 1B. As illustrated in FIG. 16, in Modification 1B, a "U"-shaped member is disposed between a male terminal connection portion 13a and a wire barrel portion 13b1 to pinch an insulator wall 14c. In Modification 1B, therefore, a second surface contact portion 13c corresponds to a contact portion between the "U"-shaped member and a second surface 14c2 of the insulator wall 14c. Also in Modification 1B, the second surface contact portion 13c supports a male terminal 13 in contact with the second surface 14c2 of the insulator wall 14c, which is the reverse side of the insulator wall 14c with respect to a first surface 14c1, so as to dig into the second surface 14c2 when a pressure of a flowing resin is applied to the wire connection portion 13b, as in the case where the second surface contact portion 13c corresponds to the wire barrel portion 13b1.

As illustrated in FIG. 16, the insulator 14 may include a support surface 16a also in Modification 1B. As illustrated in FIG. 16, the wire barrel portion 13b1 is placed opposite the support surface 16a in order to cope with variations in size of the wire barrel portion 13b1.

(4-3) Modification 1C

In the foregoing embodiment, the air blower 70 is an air blowing mechanism in the air-conditioning indoor unit 80. However, it is not limited to this, and the air blower 70 may be any other air blowing mechanism, such as an air blowing mechanism in an air-conditioning outdoor unit, an air blowing mechanism in an air cleaner, and an electric fan.

Also in the foregoing embodiment, the fan 60 of the air blower 70 is the cross-flow fan 60a. However, it is not limited to this, and the fan 60 of the air blower 70 may be any other fan 60 such as a propeller fan.

For example, with regard to an air blower including a propeller fan and an outer rotor-type motor in an air-conditioning outdoor unit configured to take in air through a rear surface and side surfaces and blow out the air through a front surface, the use of a stator similar in configuration to the resin-molded stator 10 described above, as a stator of the motor, eliminates a necessity of potting. This configuration reduces costs and processes for manufacturing the resin-molded stator 10.

(4-4)

While various embodiments of the present disclosure have been described herein above, it is to be appreciated that various changes in form and detail may be made without departing from the spirit and scope of the present disclosure presently or hereafter claimed.

REFERENCE SIGNS LIST

10: resin-molded stator
11: coil
12: female terminal
12a: female terminal connection portion
12b: spring portion
13: male terminal
13a: male terminal connection portion
13b: wire connection portion
13b1: wire barrel portion
13c: second surface contact portion
14: insulator
14b: accommodation portion
14c: insulator wall
14c1: first surface
14c2: second surface
16a: support surface
40: rotor
50: outer rotor-type motor
60: fan
70: air blower
100: air conditioning apparatus

CITATION LIST

Patent Literature

Patent Literature 1: JP 2003-163040 A

The invention claimed is:

1. A stator apparatus to be subjected to resin molding, the stator apparatus comprising:
    a coil;
    a female terminal including a female terminal connection portion and a spring portion,
    the female terminal electrically connected to the coil;
    a male terminal for motor connection, including a male terminal connection portion and a wire connection portion; and
    an insulator including an accommodation portion accommodating the female terminal connection portion, the spring portion, and the male terminal connection portion and electrically connecting the male terminal to the female terminal,
    wherein
    the insulator includes an insulator wall which is a one-directional wall that forms the accommodation portion,
    a first surface of the insulator wall is in contact with the female terminal connection portion,
    the male terminal connection portion is pressed against the female terminal connection portion by the spring portion, and is electrically connected to the female terminal connection portion,
    the wire connection portion extends opposite to the first surface of the insulator wall,
    the male terminal further includes a second surface contact portion, and
    the second surface contact portion faces a second surface of the insulator wall, the second surface corresponding to a reverse side of the insulator wall with respect to the first surface.

2. The stator apparatus according to claim 1, wherein the second surface contact portion is configured to come into contact with the second surface to inhibit a change in orientation of the male terminal connection portion at least when a force is exerted on the wire connection portion in the resin molding.

3. The stator apparatus according to claim 2, wherein the insulator wall is sandwiched between the male terminal connection portion and the second surface contact portion.

4. The stator apparatus according to claim 2, wherein the second surface contact portion corresponds to a wire barrel portion of the male terminal.

5. The stator apparatus according to claim 2, wherein the insulator further includes a support surface in addition to the second surface of the insulator wall, and
    the support surface is configured to support the male terminal when a force is exerted on the wire connection portion in the resin molding.

6. An outer rotor-type motor comprising:
    the stator apparatus according to claim 2, said stator apparatus having been resin-molded to form a resin-molded stator; and
    a rotor configured to rotate radially outside the resin-molded stator.

7. An air blower comprising:
    the outer rotor-type motor according to claim 6; and
    a fan configured to rotate with power from the outer rotor-type motor.

8. The stator apparatus according to claim 1, wherein the insulator wall is sandwiched between the male terminal connection portion and the second surface contact portion.

9. The stator apparatus according to claim 8, wherein the second surface contact portion corresponds to a wire barrel portion of the male terminal.

10. The stator apparatus according to claim 8, wherein the insulator further includes a support surface in addition to the second surface of the insulator wall, and
    the support surface is configured to support the male terminal when a force is exerted on the wire connection portion in the resin molding.

11. An outer rotor-type motor comprising:
    the stator apparatus according to claim 8, said stator apparatus having been resin-molded to form a resin-molded stator; and
    a rotor configured to rotate radially outside the resin-molded stator.

12. An air blower comprising:
    the outer rotor-type motor according to claim 11; and
    a fan configured to rotate with power from the outer rotor-type motor.

13. The stator apparatus according to claim 1, wherein the second surface contact portion corresponds to a wire barrel portion of the male terminal.

14. The stator apparatus according to claim 13, wherein the insulator further includes a support surface in addition to the second surface of the insulator wall, and
    the support surface is configured to support the male terminal when a force is exerted on the wire connection portion in the resin molding.

15. An outer rotor-type motor comprising:
    the stator apparatus according to claim 13, said stator apparatus having been resin-molded to form a resin-molded stator; and
    a rotor configured to rotate radially outside the resin-molded stator.

16. The stator apparatus according to claim 1, wherein the insulator further includes a support surface in addition to the second surface of the insulator wall, and
    the support surface is configured to support the male terminal when a force is exerted on the wire connection portion in the resin molding.

17. An outer rotor-type motor comprising:
    the stator apparatus according to claim 16, said stator apparatus having been resin-molded to form a resin-molded stator; and
    a rotor configured to rotate radially outside the resin-molded stator.

18. An outer rotor-type motor comprising:
    the stator apparatus according to claim 1, said stator apparatus having been resin-molded to form a resin-molded stator; and
    a rotor configured to rotate radially outside the resin-molded stator.

19. An air blower comprising:
    the outer rotor-type motor according to claim 18; and
    a fan configured to rotate with power from the outer rotor-type motor.

20. An air conditioning apparatus comprising the air blower according to claim 19.

* * * * *